July 22, 1952    F. W. JARDON ET AL    2,603,792
ARTIFICIAL EYE
Filed Jan. 1, 1945    3 Sheets-Sheet 1
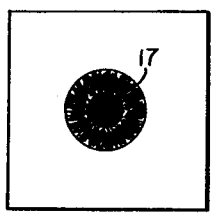
Fig. IV
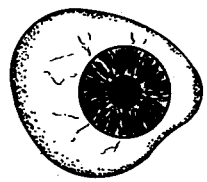
Fig. I
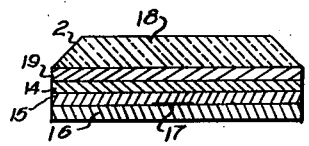
Fig. VI
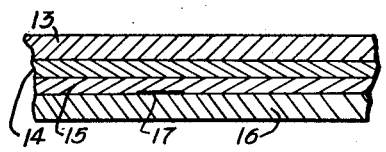
Fig. V
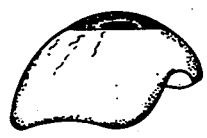
Fig. II
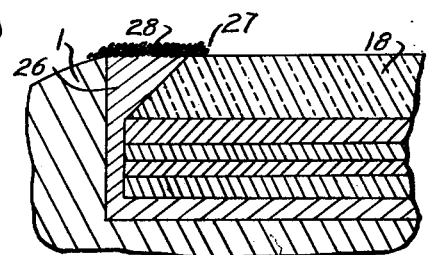
Fig. XI
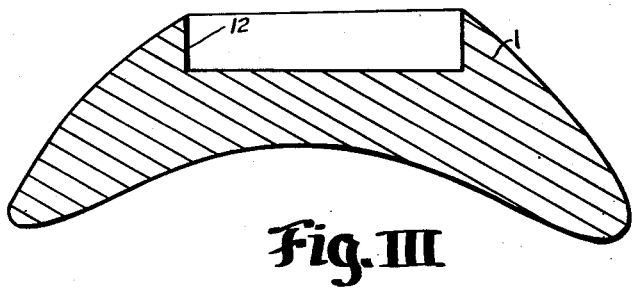
Fig. III
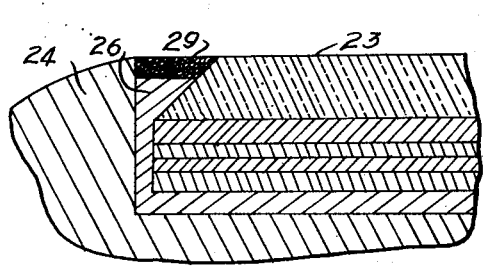
Fig. XII
INVENTOR.
FRITZ W. JARDON
REUEL W. BENNETT
BY
Louis L. Gagnon
ATTORNEY

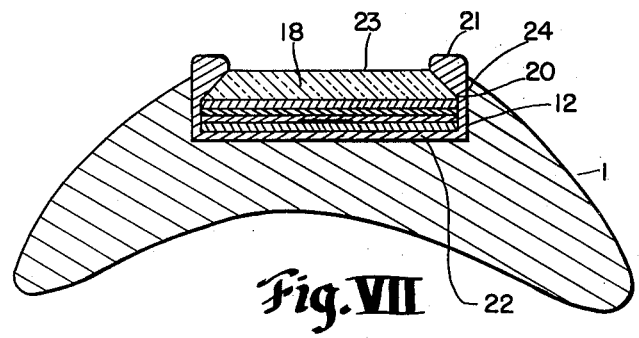
Fig. VII
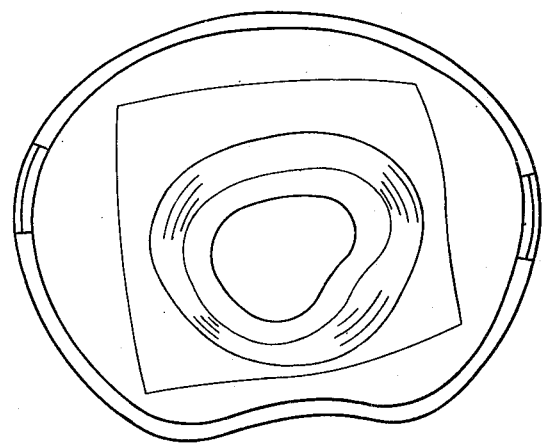
Fig. VIII

July 22, 1952  F. W. JARDON ET AL  2,603,792
ARTIFICIAL EYE
Filed Jan. 1, 1945  3 Sheets-Sheet 3
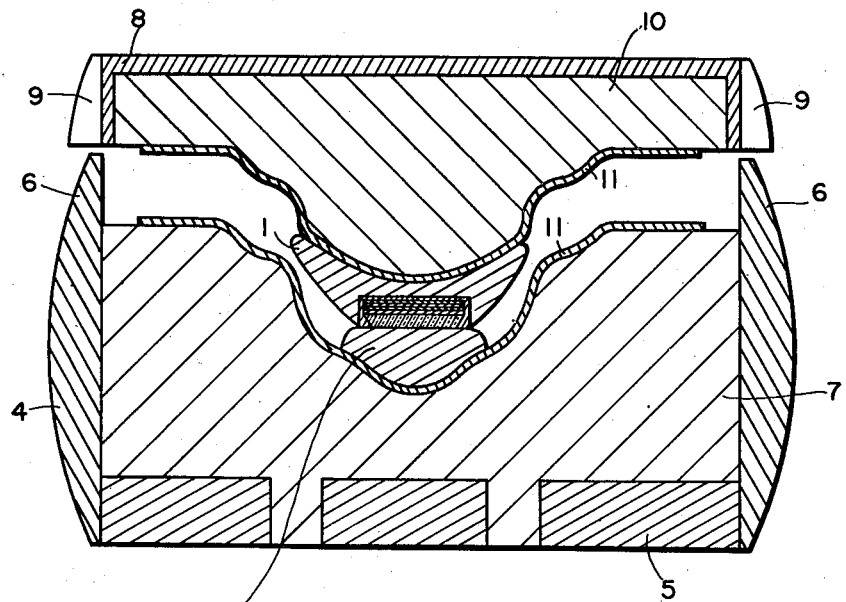
Fig. IX
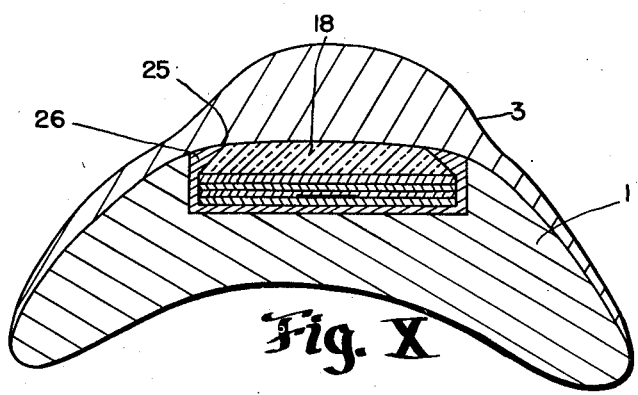
Fig. X
INVENTOR.
FRITZ W. JARDON
REUEL W. BENNETT
BY Louis L. Gagnon
ATTORNEY Patented July 22, 1952

2,603,792

UNITED STATES PATENT OFFICE 2,603,792

ARTIFICIAL EYE

Fritz W. Jardon, Charlton Depot, and Reuel W. Bennett, Southbridge, Mass., assignors to American Optical Company, Southbridge, Mass., a voluntary association of Massachusetts Application January 1, 1945, Serial No. 570,898

14 Claims. (Cl. 3—13)

This invention relates to artificial eyes and more particularly to artificial eyes constructed of plastic material.

One of the principal objects of the invention is to provide an artificial eye which more closely resembles the natural characteristics of a normal eye.

Another object is to provide an artificial eye composed of plastic materials and method of making the same whereby the resultant eye will resemble more closely the appearance of a natural eye, will be light in weight, non-frangible and more particularly resistant to contact with the body tissues, non-irritant as to said body tissues and extremely comfortable to the wearer.

Another object is to provide novel means of producing the iris portion of eyes of the above character whereby the said iris will more closely resemble the iris of the normal eye of an individual as to color, size, shape, depth, size of the pupil, and general appearance of a normal eye.

Another object is to provide novel means of producing artificial eyes of the above character with a scleral portion more closely resembling that of the normal eye as to color, vein structure and general appearance.

Another object is to provide an artificial eye of the above character which is readily adapted to change of shape so that a proper fit of the patient's eye socket after the removal of the eyeball may be more easily obtained.

Another object is to provide an artificial eye of the above character whereby the various parts will retain their relation with each other during use and the colors will have less tendency to fade.

Another object is to provide simple, efficient and economical means for producing artificial eyes of the above character.

Other objects and advantages of the present invention will become apparent from the following description taken in connection with the accompanying drawings and it will be apparent that many changes in the details of construction, arrangement of parts shown and described may be made without departing from the spirit of the invention as expressed in the accompanying claims. We, therefore, do not wish to be limited to the exact details of construction and arrangement of parts shown and described as the preferred forms only have been given by way of illustration.

Referring to the drawings:

Fig. I is a front elevational view of an eye formed according to the present invention;

Fig. II is a side elevational view of said eye;

Fig. III is a sectional view of the scleral portion of the eye illustrating a step in the process of manufacture;

Fig. IV is a face view of the film portion employed in forming the iris of the eye;

Fig. V is a fragmentary sectional view of a further step in the process of manufacture and illustrating the development of the iris portion;

Fig. VI is an enlarged sectional view illustrating a further step in the process of manufacture;

Fig. VII is a view generally similar to Fig. III illustrating a further step in the process of manufacture;

Fig. VIII is a plan view of a portion of the mould utilized in the process of manufacture;

Fig. IX is a sectional view of said mould;

Fig. X is a view generally similar to Fig. III illustrating a further step in the process of manufacture;

Fig. XI is a fragmentary sectional view of a modified step in the process of manufacture; and Fig. XII is a view generally similar to Fig. XI showing a further modification.

The present invention is directed particularly to obtaining the following novel features in an artificial eye:

1. The producing of an eye having characteristics simulating those of a patient's good eye;

2. The production of an eye which is extremely light in weight and particularly resistant to breakage;

3. The production of an eye whose shape may be readily changed so that a proper fit of a patient's eye socket after enucleation (removal of the eyeball) can be obtained;

4. The production of an eye which is light in weight, mobile, durable, and of such material that the said eye can be left in the socket constantly in order to maintain the socket's shape;

5. The production of an eye of a material whose texture is such as to be non-irritating to the socket tissues and which is particularly lacking in glare so as to prevent or obviate a glassy appearance;

6. The production of an eye whose color characteristics as to the iris and sclera are so controlled as to closely simulate those of the patient's normal eye and which are non-fadeable;

7. The production of an eye which is impervious to changes in temperature and to socket secretions so that the eye will not roughen or become pitted;

8. The production of an eye which is particularly resistant to cracking or chipping and which, if the surface of a portion thereof should become scratched, may be easily restored to its original finish; and 9. The production of an eye whose pupil appears to be back of the iris as is true of a human eye in contrast with the pupil of known prior art glass eyes which appears to float above the colored portion of the iris.

The above features are particularly outstanding as compared with known prior art artificial eyes particularly artificial eyes formed of glass, as such glass eyes cannot be fitted with the exactness of the eye of the present invention as glass eyes cannot be reshaped or altered as to their shape so as to obtain the degree of accuracy of fit as is possible with eyes embodying the present invention. The ability to reshape artificial eyes is a revolutionary feature and offers an entirely new procedure in the fitting and handling of such eyes. Once a glass eye is made it cannot be changed while the eye of the present invention may be reduced or enlarged and altered as to shape so that an exact fit may be made.

The above enumerated features clearly set forth the various objects of the present invention which distinguish from known prior art artificial eyes particularly when formed of glass.

It is known that some attempts have been made to produce artificial eyes of plastic material, but many of such eyes embody the use of a glass iris button. The pupil portion of such buttons possessed the undesirable and abnormal appearance of floating above the colored portion of the iris. They do not possess the iris characteristics and colors capable of being so controlled as to have the appearance of a normal eye and more particularly the appearance of the normal eye of an individual for which the artificial eye is being provided.

Another outstanding advantage of the invention is the simplicity of fabrication, as compared with known prior art artificial eyes formed of glass, which simplicity not only enables the eye of the present invention to be more quickly and inexpensively fabricated, but enables the weight of the eye to be greatly decreased. The eye of the present invention overcomes the hazardous characteristics of some prior art glass eyes particularly those of the blown type which in many instances in the past have been known to explode in the wearer's eye socket when subjected to sudden or sharp temperature changes. This, of course, is extremely dangerous and is completely overcome by the present invention.

Referring more particularly to the drawings wherein like characters of reference designate like parts throughout the several views, the artificial eye embodying the invention comprises three major parts, the scleral portion 1, the iris portion 2, and a transparent covering 3.

The procedure in producing the scleral portion is substantially as follows:

The correct shape of the eye to be formed may first be determined by placing a number of different shapes and sizes of trial eyes into the eye cavity of the individual to be fitted. These trial eyes may be made of a deformable or shape-alterable material such as inlay wax or the like whereby the particular shape characteristics of the individual's eye cavity may be determined. The position at which the pupil is to be located is marked or otherwise indicated on the selected or fitted trial eye. The selected eye is then used to make a mould similar to that shown in Figs. VIII and IX. This mould comprises a casing 4 having a removable plate portion 5 and a pair of substantially diametrically opposed projections 6. The said casing 4 is adapted to receive a suitable deposit of plaster 7 used in forming the mould. The said casing functions cooperatively with a removable portion 8 having substantially diametrically opposed slots 9 adapted to comate with the projections 6. The said portion 8 is also adapted to receive the plaster 10 used in forming the mould.

When forming the initial mould of the trial eye, the mould is used directly in reverse of that shown in Fig. IX, that is, the plaster composition is first deposited in the portion 8 and while in a mouldable state the selected trial eye is pressed into the plaster so as to cause a portion thereof to become embedded therein. The plaster is then allowed to harden to retain the shape of the embedded portion and the upper surface of the plaster is cut away sufficiently to expose a desired amount of the eye for forming the second half of the mould. This is to form the surface of division between the two sections of the moulds. The surface is then provided with a suitable coating of shellac, liquid soap or other suitable material which will prevent the plaster, poured into the second half of the mould, from adhering to said surface. The section 4 is then placed in assembled relation with the portion 8 with the projections 6 comating with the slots 9. The plate portion 5 is removed from the section 4 prior to the above assembling so as to enable a deposit of plaster to be poured into the casing 4 after which the plate 5 is assembled with said casing. The plaster deposit, during the pouring thereof inwardly of the casing, is adapted to assume the shape of the exposed portion of the trial eye and the shape of the upper exposed surface of the plaster in the portion 8. The plaster is then allowed to harden to retain said shape. The casing 4 is then separated from the section 8 and the wax trial eye is then removed. This causes a cavity of the shape of the trial eye to remain.

The cavity of the mould may then be increased in size by cutting or otherwise relieving portions thereof preferably along the nasal side of the cavity to allow excess material which may be ground off for more exactness of fit.

Just prior to placing the acrylic or other desired plastic material in the mould to form the scleral portion as described in Fig. III, the upper surface of the undersection of the mould, namely, the surface of the portion 10, is preferably coated with liquid soap, shellac or other suitable material for aiding in retaining the surfaces against adhesion.

The surface of the portion 7 is preferably provided with a thin coating of sheet cellophane or the like to more positively insure against adhesion.

The plastic used in forming the scleral portion is preferably a whitish translucent plastic, such as methyl methacrylate having white or other desired color pigments added thereto. A suitable deposit of said plastic in a doughy state is then placed in the mould and the assembly is then subjected to heat and pressure of an amount sufficient to cause the plastic to assume the shape of the mould cavity. The moulded plastic is thereby caused to set and harden to said shape through the completion of polymerization. This causes the plastic to be formed to the same size and shape as the selected trial eye.

A countersink or recess 12 is then formed in said moulded plastic portion in the position where the iris is to be located and is of substantially the same diameter as the iris to be formed in the resultant eye.

At the time when the trial eyes are being fitted and the proper trial eye is being selected, the color of the eye to be formed is determined by comparing a number of colored samples with the good eye of the individual. These samples may be used as they are or may require a few changes to make them match the normal eye.

To form the iris portion a photograph of the good eye of the individual or patient may be taken or a photograph is selected from a stock of negatives but must possess the major characteristics of the individual's good eye. From this negative a positive is formed on a transparent stripping film. This particular type of film, as shown diagrammatically in Figs. IV and V, has a relatively thick backing 13 of cellulose acetate adapted to support a superimposed very thin layer 14 of cellulose nitrate. On the layer of cellulose nitrate there is a layer 15 of gelatin which contains photographic materials such as a photosensitive silver compound such as bromide, iodide or mixtures thereof etc. When exposed and developed, the layer contains the photographic picture of the eye in different tones varying from black to the transparent depending upon the photographic pattern of the iris.

The color effect of the iris of the good eye is reproduced on this film by suspending an inorganic pigment in a syrupy liquid consisting of methyl methacrylate polymer dissolved in methyl methacrylate monomer or partially polymerized methyl methacrylate which may contain a plasticizer such as dibutyl phthalate or the like. The color of the inorganic pigment used, of course, is selected according to the color of the eye to be produced and one or more of several different colors may be used and placed on the gelatin layer containing the photographic picture of the iris by painting or brushing streaks or bands of said color or colors thereon depending upon the effect to be produced. The pigment is essentially opaque and thereby causes the pigmented coating 16 resulting from the above to be an opaque layer.

It is to be understood, of course, that the pupil is first produced on the film by applying a coating of black pigment in a syrupy liquid to the pupil area of the photographic film after which the pigmented coating 16 is applied or the pupil may be produced photographically, thereby requiring no painting. In instances when it is painted a transparent pupil area is formed during the photographic process. The pupil area is indicated at 17 and is controlled in size during the forming thereof so as to appear to be substantially the size of the pupil of the normal eye under normal conditions of use.

The monomer which acts as a solvent for the pigmented layer partially evaporates after being applied to the film and is partially converted into polymerized form by a curing process which takes place during the heating and compressing of the eye during the final forming thereof as will be described hereinafter.

The coated layer of cellulose nitrate having the pigmented gelatin coating 15 thereon is then stripped off the cellulose acetate backing and is cemented to a small bevelled transparent plastic disc 18, as diagrammatically shown in Fig. VI. The nitrate layer is preferably secured to the disc 18 by a coating of cement 19 of the same syrupy solution that the pigments are suspended in and is preferably secured to the disc 18 with the pigmented coating on the side of the nitrate layer 15 opposite the disc 18.

The edges of the stripped-off portion are then removed so as to cause the iris portion to conform to the contour of the disc which is substantially the size of the finished iris to be formed. For example, the portion of the film having the iris developed thereon will be in the form of a square piece with the iris centrally thereof. When this is attached to the disc, the square portion is then cut away about the contour of the iris.

The disc 18 having the iris portion secured thereto is then secured in the recess 12 through the use of a doughy mixture 20 of a polymer and monomer essentially the same as that used in moulding the scleral portion 1. The disc 18 is pressed into the doughy mixture within the recess 12 with a sufficient amount of pressure to cause the doughy mixture to ooze out around the sides of the disc 18 as shown at 21 in Fig. VII, leaving a very thin underlayer 22 and causing the outer surface 23 of the disc to assume a substantially flush relation with the outer adjacent surface 24 of the scleral portion 1. Care is taken that the doughy mixture completely fills in the space surrounding the disc 18 as shown in said figure. The excess portion of the doughy mixture which oozes out is removed and the said eye at this stage is set aside until the doughy mixture becomes hard. This takes place mostly by evaporation at room temperature.

The assembly, after the doughy mixture has been allowed to become hardened, may be ground down to cause the surface of the oozed-out portion 21 to assume a relatively smooth, flush relation with the outer surface 23 and the adjacent outer surface 24. Care is taken during the forming of said flush surface to insure that the insert has a feather edge as illustrated at 25 in Fig. X. The effect of the bevelled contour edge of the disc 18 is to cause the insert surrounding the said disc to be of a wedge shape as illustrated at 26 with the result that the wedge increases the density as it progresses outwardly from adjacent the feather edge 25.

In instances when it is desired to have the part of the eye next to the iris darker than the rest of the sclera, a paint is formed from small granules of polymerized acrylics and pigment or pigments of desired colors in any acrylic liquid which is painted over the outer surface of the wedge shaped portion 26 so that a portion of the painted coating overlies the contour of the disc 18 as illustrated at 27 in Fig. XI and overlies a portion of the sclera adjacent the wedge shaped portion 26 as illustrated at 28. This coating is allowed to dry and harden and is then ground down so as to obtain a feather edge about the contour of the disc 18 and to produce a feather edge blending into the scleral portion 1 adjacent the location 28. The grinding is carefully executed so as to cause the central portion of the coating to be slightly thicker than the contour edges. During this grinding the small granules, referred to above which are mixed with the pigments in the acrylic liquid when forming the painted coating illustrated in Fig. XI, tend to produce a pebble grain effect resulting from some of the small granules being loosened and dislodged from the coating during the grinding, thereby causing the feather edges 27 and 28 to be of a soft irregular contour. The center of the layer, at the completion of this grinding operation is preferably thicker and tapers toward the feather edges 27 and 28. If a more pronounced contour edge is desired, as shown in Fig. XII, the wedge 26 may be ground down below the outer surfaces 23 and 24 of the disc and sclera, respectively, and the recess resulting therefrom may be filled in with the paint referred to above as illustrated at 29. In this latter instance the coating resulting from said paint, when allowed to harden, is ground down substantially flush with the said outer surfaces 23 and 24.

At the completion of the forming of the scleral portion 1 with the iris insert, the scleral portion, after having been properly finished by smoothing or grinding or other desirable surfacing, may be tinted to match the scleral portion of the normal eye. This is accomplished by painting a vein structure on said scleral portion simulating the visible vein structure of the normal eye, using pigments of the proper color in water which contains a suitable wetting agent such as soap or other known commercial wetting agents, that is, any known material which lowers the surface tension of water and which would have no injurious effect on the plastic. The scleral portion may also be tinted where most of the vein structure is located by using a suspension of pigments of the proper color in a methyl methacrylate monomer such as mentioned above and achieved the effect of many small practically invisible veins. The coating resulting from this tinting is then allowed to dry and harden and the outer surface of the scleral portion is then smoothened as mentioned above.

A mould such as shown in Fig. IX is then formed having a mould aperture therein of the shape desired of the final eye. This mould is relieved to compensate for shrinkage of the plastic composition and to permit the said mould to be provided with a coating of metallic foil 11 such as tin foil or other metallic foil which will not discolor the plastic.

A deposit of a doughy polymer and monomer mixture, which upon curing will produce a transparent layer, is then placed in the cavity of the mould as illustrated at 30 in Fig. IX. The scleral portion 1, having the iris insert therein and having its outer surface tinted to simulate the general structure and color of the sclera of the normal eye, is then placed in the cavity of the mould and the upper portion of the mould designated as 10 in Fig. IX is then placed on the top of the assembly. The mould at this stage is then subjected to heat and pressure of an amount to cause the deposit 30 to flow to the shape of the mould cavity and the mould is allowed to remain under heat and pressure for a time interval sufficient to cause the complete assembly to join into an integral homogeneous structure with the said plastic compositions hardened through the completion of polymerization and to cause the complete curing of the iris and pigmented painted coatings.

When the moulded eye is removed from the mould, the outer surface will be rough and slightly out of shape. To bring the eye back to the same shape as the original selected trial eye the outer surface of the moulded plastic eye is ground off to remove the excess clear or transparent plastic and the said eye is then provided with a smooth polished surface.

The resultant artificial eye, therefore, will be essentially a plastic composition having a clear transparent coating overlying the iris insert and the scleral portion with the portion of the transparent surface overlying the iris being curved substantially to the curvature of the cornea of the normal eye thereby causing the said resultant eye to possess substantially the same optical characteristics as the corneal portion of the normal eye.

One of the unique advantages of the present construction is that the various parts of the eye are formed of plastic material having substantially the same coefficient of expansion so that the shrinkage, which takes place during the completing of the curing or polymerization of the shaped eye in the mould, will be substantially uniform so that there is less tendency or danger of separation of the various parts throughout their contiguous surfaces.

It is particularly pointed out that the structure set forth above comprises essentially three pieces fused into one so that the finished product is a one-piece all plastic eye. The resultant eye has three dimensional characteristics with depth similar to the real or normal eye of the individual and possesses substantially the same color characteristics of said eye.

Another feature of this type of eye is that surface reflections from the eye are soft and more life-like and are decidedly lacking in glare and artificial glassy appearance. The resultant eye is extremely resistant to fracture. The colors are non-fading and the eye in general is particularly resistant or impervious to socket secretions and to changes in temperature.

Another desired advantage is that the eye is light in weight, mobile and durable and is particularly non-irritating to the socket tissues.

The iris, due to the use of a photographic picture of the iris of the normal eye or to a photograph selected from a stock of negatives and which has the major characteristics of the individual's normal eye, has a more life-like and realistic appearance. Due to the fact that the picture portion of the iris, having the colored pigments positioned so as to lie beneath said picture portion, will cause the iris to possess the variation in brightness of the color of the iris as exists in the normal eye, this variation in brightness results from the superimposing of the light and dark part of the photographic iris on the color and thereby greatly simplifies the reproducing of the appearance of the normal eye. The third dimensional effect previously mentioned above may be increased by increasing the thickness of the disc 18 thereby causing the distance between the iris pigmented layer and the outer surface of the cornea to be increased in the finished eye. This increased depth may also be obtained by forming the outer surface of the corneal portion to a shorter radius thereby causing the iris to appear as being at a greater depth. The depth may also be increased by initially forming the photograph of the iris portion more dense or darker during its initial development and by using lighter colored pigments for the undercolored layer thereby increasing the contrast between the pigments and the darker colored markings. This procedure may be reversed to decrease the depth if desired, thereby giving an additional control as to the characteristics of the finished eye.

Although methyl methacrylate has been referred to above as the preferred artificial plastic used in forming the eye, other known artificial resins may be used such as acrylic resins, methacrylic resins, methyl acrylate, butyl acrylate, polystyrene or the like or any known artificial resin capable of withstanding eye secretions and which, under conditions of use, will not irritate the socket tissues.

Although photographic stripping of the cellulose nitrate type has been set forth above as the preferred sheeting used in forming the photographic iris, it is to be understood that any known photographic means of the type embodying a relative thin picture layer which may be stripped from the backing may be used. For example, a wet plate embodying a backing of glass having a thin picture layer that may be stripped from the glass may be used. Of course, in using such a plate the pigmented coating would be placed on the layer that is stripped from the glass backing. Another method of forming the iris portion is that of placing a coating of photographic emulsion directly on the undersurface of the disc 18 and exposing it to the iris pattern desired. In this instance the picture layer is directly on the disc and merely requires the placing of a pigmented coating thereon.

It is particularly pointed out that when initially forming the pigmented layer 16 on the film stripping care should be exercised that the surface texture of the coating be substantially uniform so as to insure more intimate surface to surface relation of said pigmented coating and the layer 15. This is accomplished by forming the pigment particles more uniform in size and by controlling the amount of acrylic in the paint mixture so that it will be of a very syrupy nature and can be more uniformly applied.

It may be desirable in some instances to provide the undersurface of the layer 15 with a relatively thin coating of cellulose nitrate prior to placing the pigmented coating thereon. This is to form a more positive bond between the pigmented layer 16 and the layer 15.

From the foregoing description it will be seen that simple, efficient and economical means and methods have been provided for accomplishing all of the objects and advantages of the invention.

Having described our invention, we claim:

1. An artificial eye comprising a ball portion of translucent plastic material having a recess therein, a disc of transparent material secured in said recess by a translucent plastic material simulating the material of the ball portion, said disc having a thin photographic film of a given iris pattern secured thereto between said disc and the ball portion, said film having a pigmented coating of a given color pattern on the undersurface thereof and a transparent plastic coating overlying the disc and adjacent surface of the ball portion.

2. An artificial eye comprising a ball portion of translucent plastic material having a recess therein, a disc of transparent plastic material having a bevelled edge secured in said recess by a translucent plastic material simulating the material of the ball portion, said disc having a thin photographic film of a given iris pattern secured thereto between said disc and the ball portion, said photographic film having an under-pigmented coating of a given color pattern thereon and a layer of transparent material overlying said disc and the adjacent outer surface of the ball portion.

3. An artificial eye comprising a ball portion of translucent plastic material having a recess therein, a disc of transparent plastic material having a bevelled edge secured in said recess by a translucent plastic material simulating the material of the ball portion, said disc having a thin photographic film of a given iris pattern secured thereto between said disc and the ball portion, said photographic film having an under-pigmented coating of a given color pattern thereon and a layer of transparent material overlying said disc and the adjacent outer surface of the ball portion, said adjacent outer surface of the ball portion having a given vein pattern thereon interposed between the ball portion and the outer transparent coating.

4. An artificial eye comprising a ball portion of translucent plastic material of substantially the color of the sclera of the normal eye of an individual, said ball portion having a recess therein, a disc of transparent plastic material having its edge bevelled with the bevel extending outwardly and rearwardly from the front surface of the disc toward the rear surface, said disc being secured in said recess by a translucent plastic material simulating the material and color of the ball portion, said disc having a thin photographic film substantially of the iris pattern of the normal eye on the undersurface thereof, said film having a pigmented coating of substantially the color pattern of the normal eye thereon between said film and the ball portion and a coating of transparent plastic material overlying the disc and the adjacent outer surface of the ball portion and shaped with an outer surface simulating the shape of the outer surface of the normal eye.

5. An artificial eye comprising a ball portion of translucent plastic material of substantially the color of the sclera of the normal eye of an individual, said ball portion having a recess therein, a disc of transparent plastic material having its edge bevelled with the bevel extending outwardly and rearwardly from the front surface of the disc toward the rear surface, said disc being secured in said recess by a translucent plastic material simulating the material and color of the ball portion, said disc having a thin photographic film substantially of the iris pattern of the normal eye on the undersurface thereof, said film having a pigmented coating of substantially the color pattern of the normal eye thereon between said film and the ball portion and a coating of transparent plastic material overlying the disc and the adjacent outer surface of the ball portion and shaped with an outer surface simulating the shape of the outer surface of the normal eye, the said outer surface of the ball portion having a vein pattern thereon simulating the vein pattern of the normal eye.

6. An artificial eye comprising a ball portion formed of translucent plastic material integrally bonded with a relatively thin outer layer of transparent plastic material and an iris comprising a thin photographic film of a given iris pattern having an undercoating of a given color pattern thereon interposed between said ball portion and said outer layer.

7. An artificial eye comprising a ball portion formed of a translucent artificial resin of a color substantially equivalent to the normal eye of an individual, said ball portion being integrally bonded with an outer layer of transparent artificial resin shaped substantially to the shape of the outer surface of the normal eye and an iris interposed between said ball portion and said outer layer, said iris being formed of a relatively thin photographic film substantially of the iris pattern of the normal eye and having a pigmented coating thereon of substantially the color pattern of the normal eye lying between said film and said ball portion.

8. An artificial eye comprising a ball portion formed of a translucent artificial resin of a color substantially equivalent to the normal eye of an individual, said ball portion being integrally bonded with an outer layer of transparent artificial resin shaped substantially to the shape of the outer surface of the normal eye and an iris interposed between said ball portion and said outer layer, said iris being formed of a relatively thin photographic film substantially of the iris pattern of the normal eye and having a pigmented coating thereon of substantially the color pattern of the normal eye lying between said film and said ball portion, the outer surface of said ball portion having a vein pattern thereon simulating the vein pattern of the normal eye and interposed between said ball portion and said outer layer.

9. An artificial eye comprising a ball portion of translucent plastic material of substantially the same color as the sclera of the normal eye of an individual, said ball portion having a recess therein, a disc of transparent plastic material secured within said recess by a plastic material simulating the material of the ball portion, a relatively thin sheet of cellulose nitrate having a photographic pattern coating thereon of substantially the same pattern as the normal eye, a pigmented coating on said photographic pattern coating of substantially the color pattern of said normal eye and a coating of transparent plastic material overlying said disc portion and the surrounding adjacent outer surface of the ball portion and shaped substantially to the shape of the outer surface of said normal eye.

10. An artificial eye comprising a ball portion of translucent plastic material of substantially the same color as the sclera of the normal eye of an individual, said ball portion having a recess therein, a disc of transparent plastic material secured within said recess by a plastic material simulating the material of the ball portion, a relatively thin sheet of cellulose nitrate having a photographic pattern coating thereon of substantially the same pattern as the normal eye, a pigmented coating on said photographic pattern coating of substantially the color pattern of said normal eye and a coating of transparent plastic material overlying said disc portion and the surrounding adjacent outer surface of the ball portion and shaped substantially to the shape of the outer surface of said normal eye, the said outer surface of the scleral portion intermediate the ball portion and the transparent coating being provided with vein lines simulating the vein lines of the normal eye.

11. An artificial eye comprising a ball portion of translucent plastic material having a recess therein, a disc of transparent plastic material having a bevelled edge extending outwardly and rearwardly from the front surface thereof, an iris portion of a given iris pattern and desired color secured to said disc, said disc and attached iris portion being secured within the recess by a plastic adhesive material with said material overlying the bevelled edge of the disc and having an outer surface substantially flush with the outer surface of the disc and the adjacent outer surface of the ball portion, said outer surface of said plastic adhesive having a pigmented coating of desired color thereon and a coating of transparent plastic material overlying said disc, said pigmented coating and the adjacent outer surface of the ball portion.

12. An artificial eye comprising a ball portion of plastic material, an outer portion of transparent material, and an iris portion interposed therebetween, said iris portion comprising a relatively thin piece of transparent material having a pattern portion on its underside and a layer of color disposed below said pattern portion and visible therethrough, said pattern portion consisting of a plurality of radially extending areas each of an individual contour shape reproducing substantially the shape of a corresponding part of the pattern of a natural iris, and varying in tones from dark to light so as to control the brightness of the layer of color visible therethrough at selected areas and thereby produce the desired appearance of the iris in the completed eye.

13. An artificial eye comprising a ball portion of plastic material having a recess in the forward side thereof, a disc of transparent material seated in said recess, said disc having a beveled edge extending outwardly and rearwardly from the front surface thereof having a pattern portion on its underside, and a layer of color disposed below said pattern portion and visible therethrough, said pattern portion consisting of a plurality of radially extending areas each of an individual contour shape reproducing substantially the shape of a corresponding portion of the pattern of a natural iris, and varying in tones from dark to light so as to control the brightness of the layer of color visible therethrough at selected areas and thereby produce the desired appearance of the iris in the completed eye, a ring-like density varying member of wedge-shape section overlying the beveled edge of the disc and having its outer surface approximately flush with the adjacent surface of the ball portion and forward surface of the disc, and an outer coating of transparent material overlying said disc, ring-like portion and the adjacent surrounding surface of the ball portion.

14. An artificial eye comprising a ball portion of translucent plastic material having a recess therein, a disc of transparent plastic material having a beveled edge extending outwardly and rearwardly from the front surface thereof, an iris portion of a given iris pattern and desired color secured to said disc, said disc and attached iris portion being secured within the recess by a plastic adhesive material with said material overlying the beveled edge of the disc and having an outer surface substantially flush with the outer surface of the disc and the adjacent outer surface of the ball portion, and a coating of transparent plastic material overlying said disc, said adhesive material and the adjacent outer surface of the ball portion.

FRITZ W. JARDON.
REUEL W. BENNETT.

REFERENCES CITED

The following references are of record in the file of this patent:

UNITED STATES PATENTS

| Number | Name | Date |
| --- | --- | --- |
| 303,726 | Hamecher | Aug. 19, 1884 |
| 1,979,321 | Dunner | Nov. 6, 1934 |
| 1,993,121 | Travers | Mar. 5, 1935 |
| 2,497,872 | Erpf et al. | Feb. 21, 1950 |

OTHER REFERENCES

"Oregon Journal," Sunday, Oct. 11, 1942, page 7, article on the Noles Plastic Eyes of F. T. Humphrey.